United States Patent [19]
Suzuki

[11] Patent Number: 5,357,542
[45] Date of Patent: Oct. 18, 1994

[54] REPEATER STATION WHEREIN INPUT FRAME DATA ARE ACCESSIBLE

[75] Inventor: Eiji Suzuki, Kawasaki, Japan

[73] Assignee: Fujitsu Limited, Kawasaki, Japan

[21] Appl. No.: 162,903

[22] Filed: Dec. 8, 1993

Related U.S. Application Data

[63] Continuation of Ser. No. 854,681, Mar. 20, 1992, abandoned.

[30] Foreign Application Priority Data

Mar. 20, 1991 [JP] Japan .................... 3-56510

[51] Int. Cl.⁵ .......................... H04B 7/17; H04L 25/52
[52] U.S. Cl. ......................... 375/3; 375/106; 375/116; 375/4; 370/105.1
[58] Field of Search ........... 375/3, 4, 106, 108, 375/114, 116; 370/55, 100.1, 105.1, 110.1; 455/7, 13.2, 51.1, 51.2; 359/174, 176; 379/338, 343

[56] References Cited

U.S. PATENT DOCUMENTS

| | | | |
|---|---|---|---|
| 4,726,013 | 2/1988 | Kawashima et al. | 370/55 |
| 4,819,226 | 4/1989 | Beckner et al. | 370/55 |
| 4,876,683 | 10/1989 | Suzuki | 370/105.1 |
| 5,113,395 | 5/1992 | Murakami et al. | 370/105.1 |

FOREIGN PATENT DOCUMENTS

81/03729 12/1981 PCT Int'l Appl. .

OTHER PUBLICATIONS

*Patent Abstracts of Japan*, vol. 10, No. 272 (E-437), Sep. 16, 1986 & JP-A-61 094426 (Nippon Telegr & Teleph Corp (NTT), May 13, 1986.

J. D. Richman & P. C. Smith, "Transmission of Synchronous Digital Hierarchy Signals by Radio," *IEEE Internatinoal Conference on Communications ICC '90*, vol. 1, Atlanta, Ga., Apr. 16–19, 1990, pp. 81–87.

*Primary Examiner*—Stephen Chin
*Assistant Examiner*—Don Vo
*Attorney, Agent, or Firm*—Staas & Halsey

[57] ABSTRACT

A repeater station comprises an RFD frame synchronization circuit, an AND gate, and an IFD frame synchronization circuit. The RFD frame synchronization circuit outputs a frame synchronization signal indicating the timing of an auxiliary signal by performing frame synchronization with regard to the RFD. The AND gate inhibits clock signals during periods of the auxiliary signals and allows the clock signals to pass through during the other periods. The IFD frame synchronization circuit performs frame synchronization of the RFD with regard to the IFD by carrying out frame synchronization operation in accordance with the clock signals output from the AND gate. The IFD are accessible in the above simple construction.

5 Claims, 6 Drawing Sheets

REPEATER STATION WHEREIN INPUT FRAME DATA ARE ACCESSIBLE

This application is a continuation of application number Ser. No. 07/854,681, filed Mar. 20, 1992, now abandoned.

BACKGROUND OF THE INVENTION

1. Field of the Invention

The present invention relates to a repeater station for relaying transmission signals with amplification and/or shaping of the transmission signals in a radio transmission system. More particularly, the present invention is concerned with the repeater station adapted to a digital multiplex radio transmission system wherein radio frame data constructed by inserting auxiliary signals for radio transmission into input frame data including multiple signals are transmitted and relayed.

2. Description of the Related Art

In a general digital multiplex radio transmission system, RFD (Radio Frame Data) are constructed in the sending end by inserting auxiliary signals into IFD (Input Frame Data) which are multiple signals conforming to a prescribed frame form. The RFD are modulated in a modulator and then transmitted from a transmitter. The auxiliary signals include a frame synchronization signal for frame synchronization of the RFD, an error-correcting code for detecting and correcting errors in radio transmission, and a signal of a digital service channel, etc. In the receiving end, the signal received in a receiver is demodulated in a demodulator and the auxiliary signals are removed to reproduce the IFD.

A required number of repeater stations is located between the sending end and the receiving end. In the repeater station, the received signal is demodulated into a baseband signal. The baseband signal is shaped by synchronizing same with a clock signal ticking time of the baseband signal and the shaped baseband signal is again modulated and then transmitted. If the auxiliary signal must be read/written in the repeater station, frame synchronization with regard to the RFD is performed to give access to the auxiliary signal.

As mentioned above, in the general digital multiplex radio transmission system, it is enough sufficient, for operation of the repeater station, that frame synchronization with regard to the RFD is afforded.

However, there is a special case where information included in the IFD must be accessible. The case is, for example, where signals conforming to a frame form prescribed in an NNI (Network Node Interface) in an ISDN (Integrated Services Digital Network) are transmitted. A data frame, conforming to an SDH (Synchronous Digital Hierarchy) as the NNI, includes an SOH (Section OverHead) area containing network management information. The network management information includes information for watching repeater stations. Accordingly, also in the repeater station, the SOH must be accessible, that is, the IFD must be accessible in the repeater station relaying the SDH frames.

Nevertheless, access to the IFD is not easy in the repeater station, because the RFD is generally constructed in asynchronism with the frame form of the IFD and therefore the IFD does not become accessible only by frame-synchronizing with the RFD.

This problem may be overcome if the RFD is constructed by inserting the auxiliary signals in synchronism with the frame form of the IFD. Then, the IFD becomes accessible only by frame-synchronizing with the RFD.

However, this solution raises another problem that a degree of freedom in design of the frame form of the RFD is lowered. If the ratio of the auxiliary bits, especially, the ratio of the error correcting code inserted to construct the RFD is higher, the capability of error correction is higher but the transmission rate must be elevated and therefore the bandwidth occupied in the radio frequency becomes large. For this reason, an appropriate frame form of the RFD must be designed in accordance with the quality of the radio transmission path by trading off both factors. Thus, the fact that the degree of freedom in design of the RFD is lowered is unfavorable.

The IFD may also become accessible in a construction where the auxiliary signals are removed after frame synchronization with the RFD; the transmission rate is altered using an elastic memory to obtain the IFD, and then frame synchronization with the IFD is performed, in the repeater station, as is usually done in the receiving end. But this construction is complex and requires large size circuits.

SUMMARY OF THE INVENTION

It is an object of the present invention to provide a repeater station having a simple construction and enabling access of information contained in an original frame form of data even if a transmission frame constructed in asynchronism with the original frame form is relayed.

In accordance with the present invention, there is provided a repeater station for relaying a series of first information signals constructed by inserting first auxiliary signals in accordance with a first frame form into a series of second information signals including second auxiliary signals conforming to a second frame form, comprising first frame synchronization means to which the first information signals and clock signals ticking time of the first information signals are input, for performing frame synchronization of the first information signals with regard to the first frame form by operating in accordance with the clock signals, to thereby output first frame synchronization signals indicating the timing of the first auxiliary signals, gate means to which the clock signals and the first frame synchronization signals are input, selectively operate for inhibiting the clock signals at the timing of the first auxiliary signals and for allowing the clock signals to pass through at the other timing, and second frame synchronization means to which the first information signals and clock signals passing through the gate means are input for performing frame synchronization of the first information signals with regard to the second frame form by operating in accordance with the clock signals passing through the gate means, to thereby output second frame synchronization signals indicating the timing of the second auxiliary signals included in the first information signals.

DESCRIPTION OF THE PREFERRED EMBODIMENTS

Figure 1:
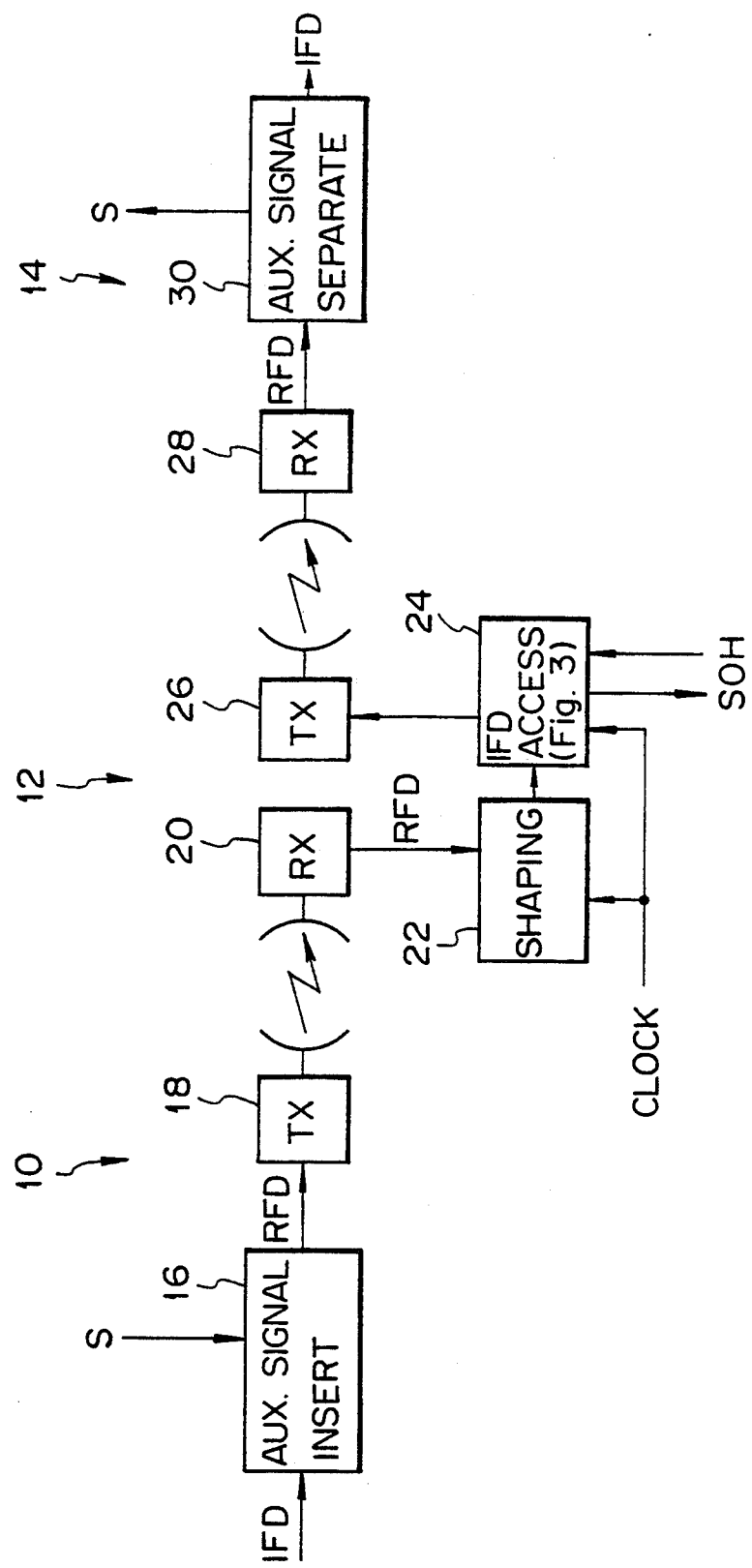
FIG. 1 is a schematic block diagram of a digital multiplex radio transmission system according to an embodiment of the present invention.

FIG. 1 is a schematic block diagram of a digital multiplex radio transmission system including a repeater station according to an embodiment of the present invention. In FIG. 1, a transmitting station 10, the repeater station 12 and a receiving station 14 are shown. In the transmitting station 10, an auxiliary signal S is inserted into IFD (Input Frame Data) having a frame form of SDH (Synchronous Digital Hierarchy) frame according to a frame form of RFD (Radio Frame Data), to form RFD, in an auxiliary signal inserting circuit 16. The RFD is modulated and transmitted from the transmitter 18.

The repeater station 12 includes a receiver 20 for receiving the signal and for demodulating the received signal to output a baseband signal, a waveform shaping circuit 22 for shaping the baseband signal by synchronizing same with a clock signal ticking time of the baseband signal, an IFD access circuit 24 (described later in detail), and a transmitter 26.

In the receiving station 14, the signal is received and demodulated in a receiver 28 to reproduce the RFD at baseband. In an auxiliary signal separating circuit 30, the auxiliary signal S is separated and the transmitting rate is altered to reproduce the IFD.

Figure 2:
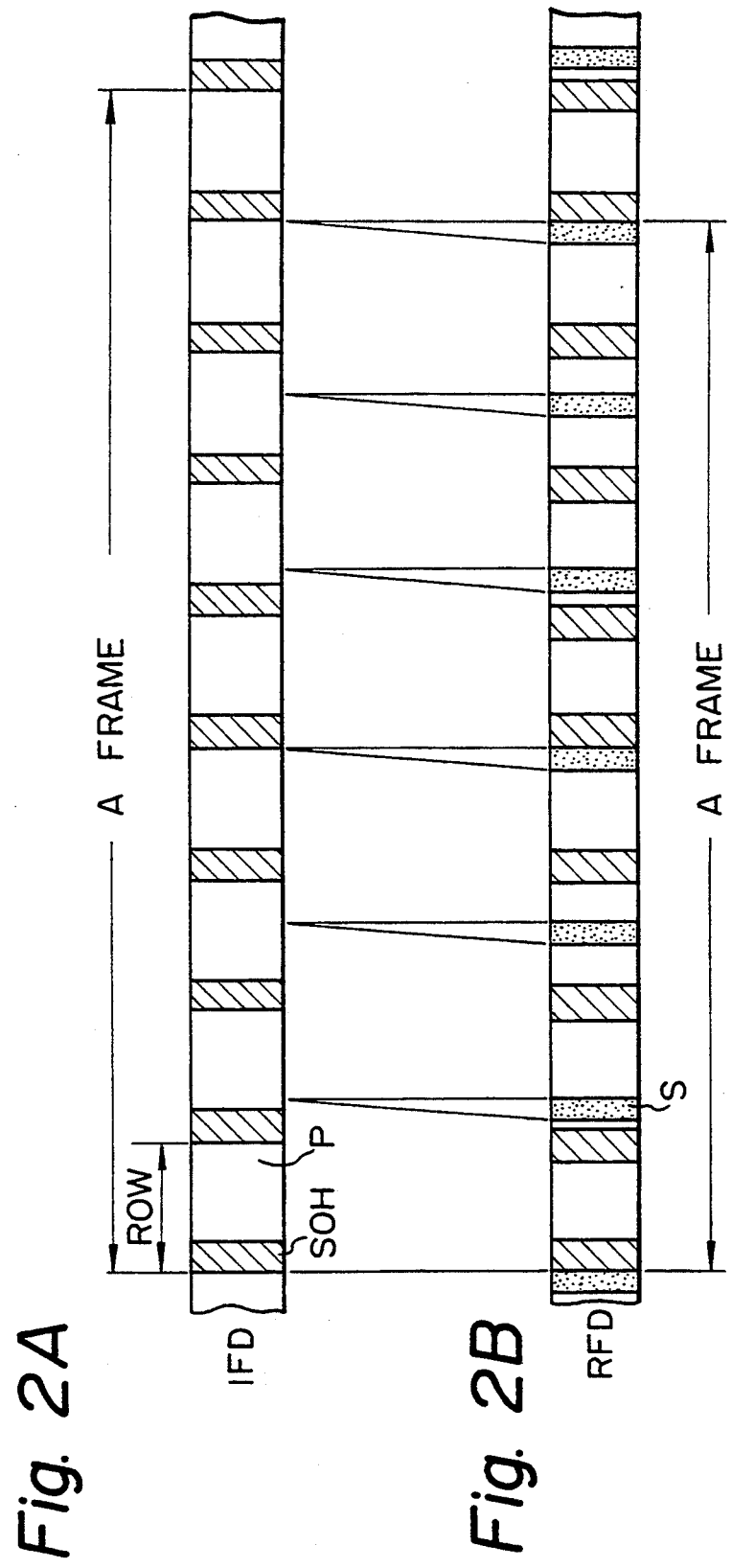
FIG. 2A is a diagram showing a schematic frame form of a SDH frame as an IFD.
FIG. 2B is a diagram showing a schematic frame form of an RFD.

FIG. 2A shows a schematic frame form of the SDH frame prescribed as NNI of ISDN. In the SDH frame, a Row consists of a hatched SOH (Section OverHead) and a payload section P, and nine Row constitute a frame. When IFD having a frame form shown in FIG. 2A is radio-transmitted, auxiliary signals S are inserted in accordance with a prescribed frame form of RFD as shown in FIG. 2B. As shown in FIGS. 2A and 2B, the auxiliary signals S are inserted into the IFD in asynchronism with the frame form of the IFD.

Figure 3:
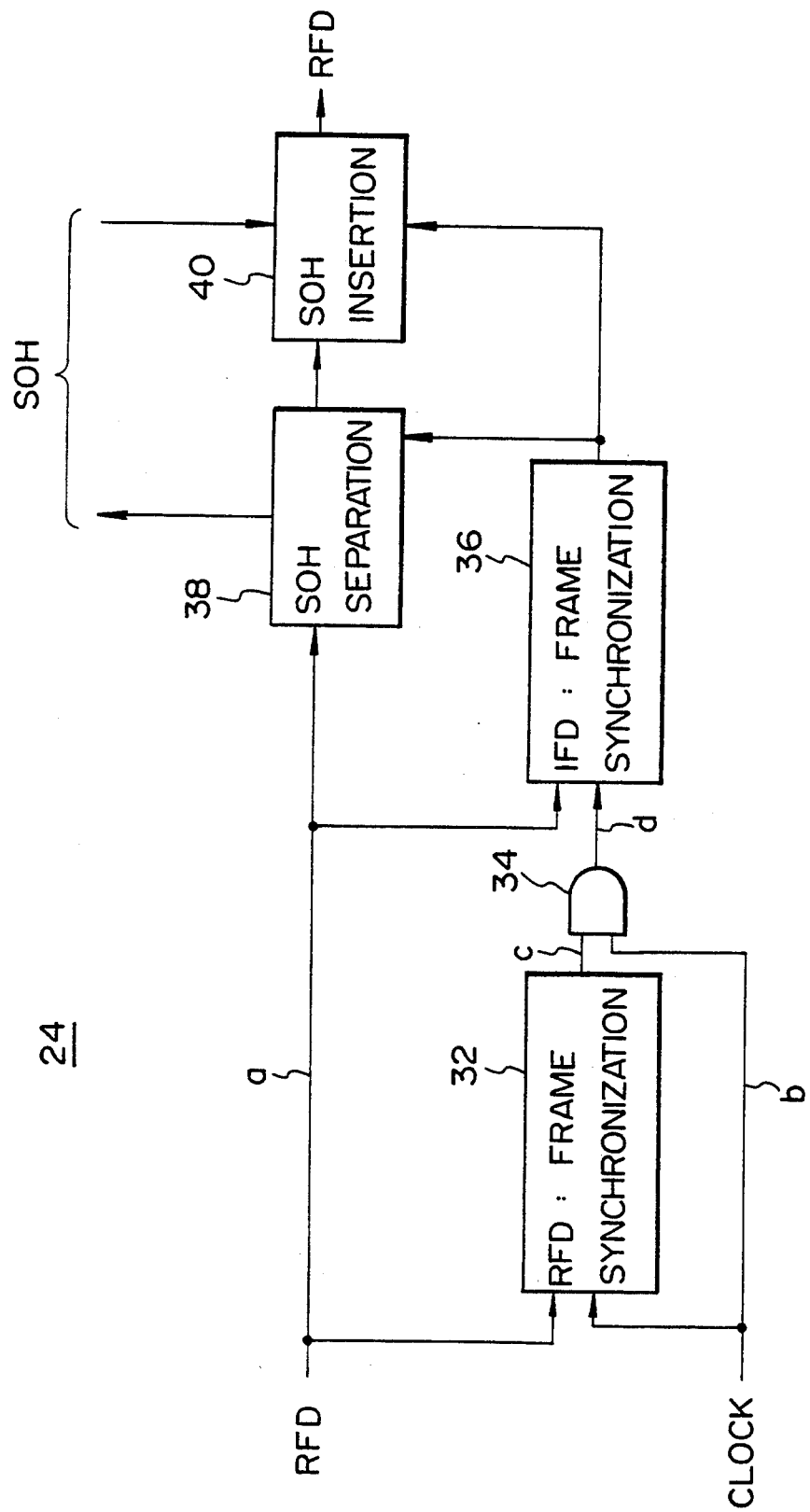
FIG. 3 is a block diagram showing a more detailed construction of the IFD access circuit 24 of FIG. 1.

FIG. 3 is a block diagram showing a more detailed construction of the IFD access circuit 24 of FIG. 1.

An RFD frame synchronization circuit 32 operates according to a clock signal ticking time of the baseband signal. In the circuit 32, frame synchronization of the input signal is done with regard to frame form of RFD. After the frame synchronization has been established, the circuit 32 outputs a synchronization signal at the time or each auxiliary signal included in the RFD.

The signal output from the circuit 32 is input to one input of an AND gate 34, and the clock signal is input to another input of the AND gate 34. Therefore, each time the signal indicating the timing of the auxiliary signal is output from the circuit 32, the AND gate 34 is closed thereby to inhibit the clock signal. Thus, the clock signal output from the AND gate 34 ticks time of RFD except for the auxiliary signals, that is, only time corresponding to IFD included in the RFD.

In an IFD frame synchronization circuit 36, frame synchronization of an input signal is performed with regard to a frame form of IFD. Since the RFD and the clock signal ticking time of the IFD signal are input to the circuit 36, the circuit 36 performs the frame synchronization operation according to the clock signal ticking time of the IFD, as if the RFD input were the IFD. Thus, the IFD frame synchronization circuit 36 can output a signal indicating the timing of the SOH included in the IFD.

An SOH separation circuit 38 reads out the SOH from the RFD according to the output signal of the circuit 36. An SOH insertion circuit 40 writes the SOH on the RFD.

Figure 4A:
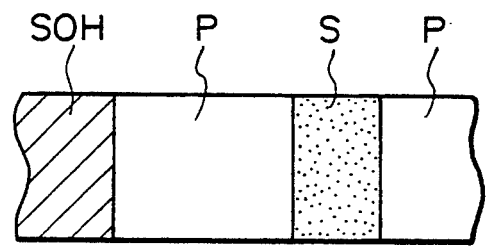
FIGS. 4A to 4D are waveform diagrams for explaining an operation of the circuit 24 of FIG. 1.
Figure 4B:
Figure 4C:
Figure 4D:

FIGS. 4A to 4D are waveform diagrams showing waveforms in lines denoted by a to d in FIG. 3, respectively. Referring to FIG. 4A, the RFD is constructed by inserting the auxiliary signal S into the IFD constituted by the SOH and the payload section P. FIG. 4B shows the original clock signal. As shown in FIG. 4C, the signal output from the RFD frame synchronization circuit 32 becomes L level only during the period of the auxiliary signal S. The clock signal is inhibited during this period by the AND gate 34, as shown in FIG. 4D. Therefore, the operation of the IFD frame synchronization circuit 36 is interrupted during this period and is continued during the other periods according to the clock signal, and thus the circuit 36 can perform a frame synchronization operation as if the IFD were input, although the RFD actually is input.

Figure 5:
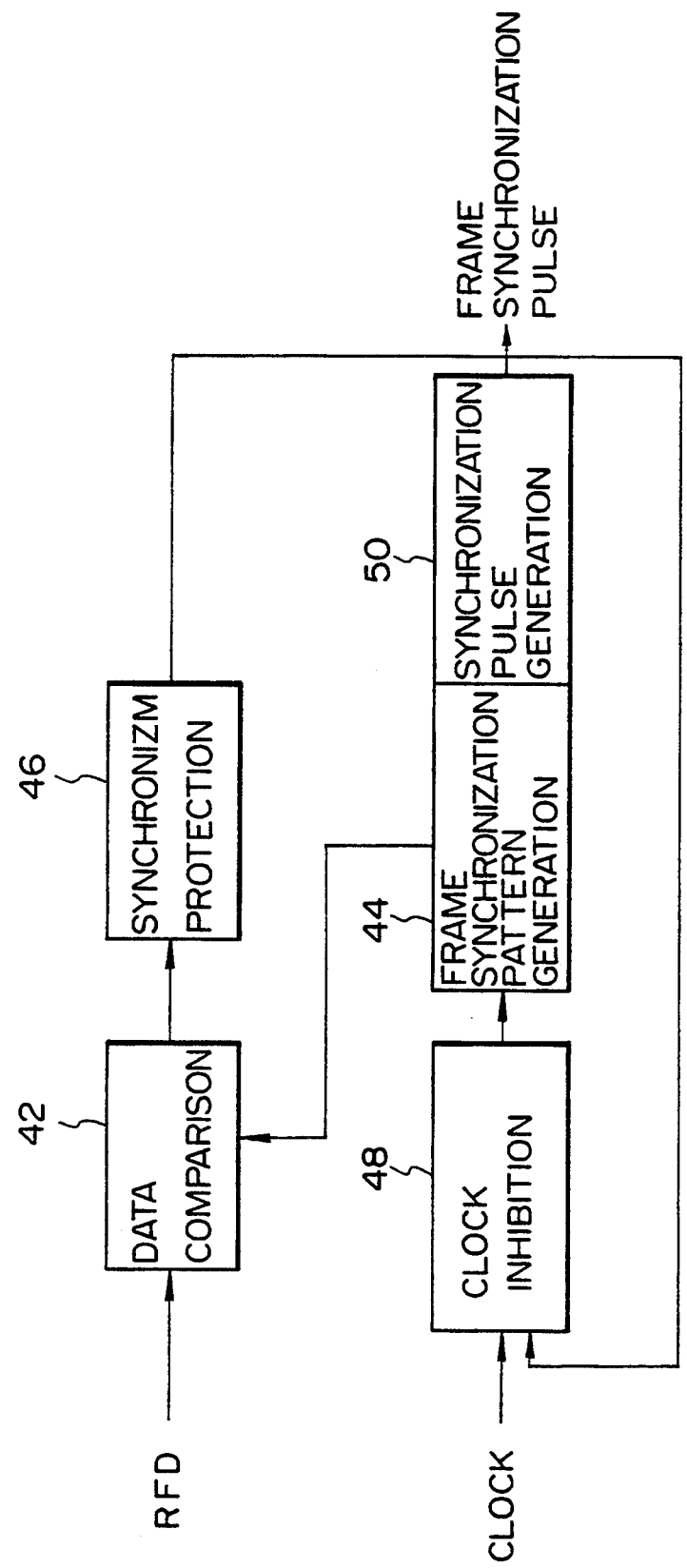
FIG. 5 is a block diagram showing a more detailed construction of the RFD frame synchronization circuit 32 of FIG. 3.

FIG. 5 is a block diagram showing a more detailed construction of the RFD frame synchronization circuit 32 of FIG. 3. The RFD are compared in a data comparison unit 42 with a frame synchronization pattern generated in a frame synchronization pattern generation unit 44 constructed so as to cyclically generate the frame synchronization pattern operating in accordance with the input clock signal. The comparison results are given to a synchronism protection unit 46. The synchronism protection unit 46 lets a clock inhibition unit 48 inhibit the clock signal from passing if coincidence is not detected in the data comparison unit 42, and releases the clock inhibition unit 48 from inhibition of a clock signal if coincidence is detected in the data comparison unit 42.

If the coincidence is successively detected during a predetermined period, the synchronism protection unit 46 enters a synchronism establishment mode in which the clock inhibition unit 48 permits the clock signal to pass through until the mode is released. If disagreement is successively detected during a predetermined period, the synchronism protection unit 46 regards this circumstance as pulling out of synchronism, and the synchronism establishment mode is released. Accordingly, during the synchronism establishment mode, the frame synchronization pattern generation unit 44 and a synchronization pulse generation unit 50 operating in synchronism with the frame synchronization pattern generation unit 44 are successively supplied with the clock signal to renew their operation steps. Therefore, during this mode, the frame synchronization pattern generation unit 44 cyclically outputs the frame synchronization pattern to the data comparison unit 42 in accordance with the frame form of the RFD, and the synchronization pulse generation unit 50 cyclically outputs a frame synchronization pulse, i.e., a signal indicating the timing of the auxiliary signals, in accordance with the frame form of the RFD.

The IFD frame synchronization circuit 36 has a construction essentially similar to that of the RFD frame synchronization circuit 32, except that the frame synchronization pattern generation unit 44 and the synchronization pulse generation unit 50 operate in accordance with the frame form of the IFD and the synchronization pulse generation unit 50 outputs a signal indicating the timing of the SOH, as the frame synchronization pulse.

Figure 6:
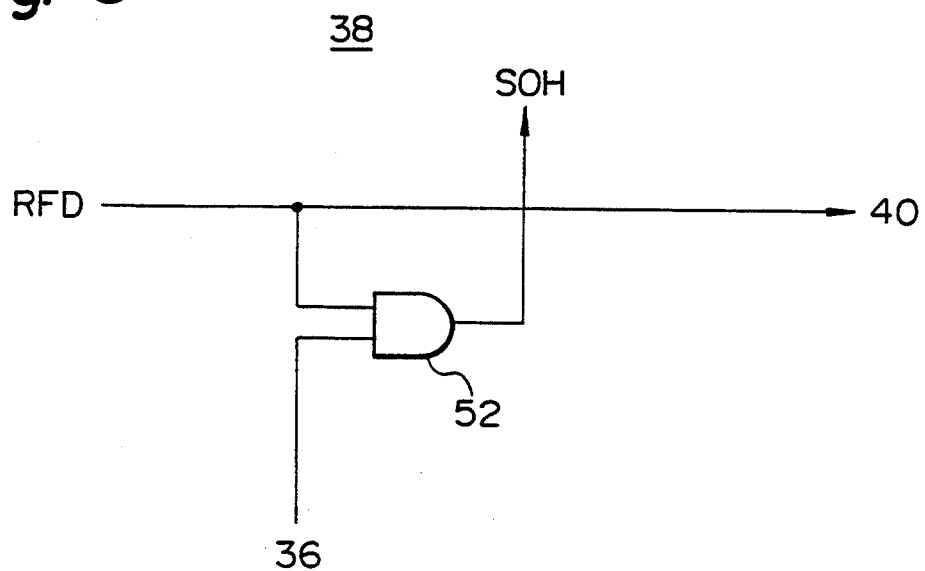
FIG. 6 is a circuit diagram showing a more detailed construction of the SOH separation circuit 38 of FIG. 3.

FIG. 6 is a circuit diagram of the SOH separation circuit 38 of FIG. 3. The RFD are input to one input of an AND gate 52 and the synchronization pulses, indicating the timing of the SOH output from the IFD frame synchronization circuit 36, are input to another input of the AND gate 52. Therefore, the SOH is separately obtained in an output of the AND gate 52.

Figure 7:
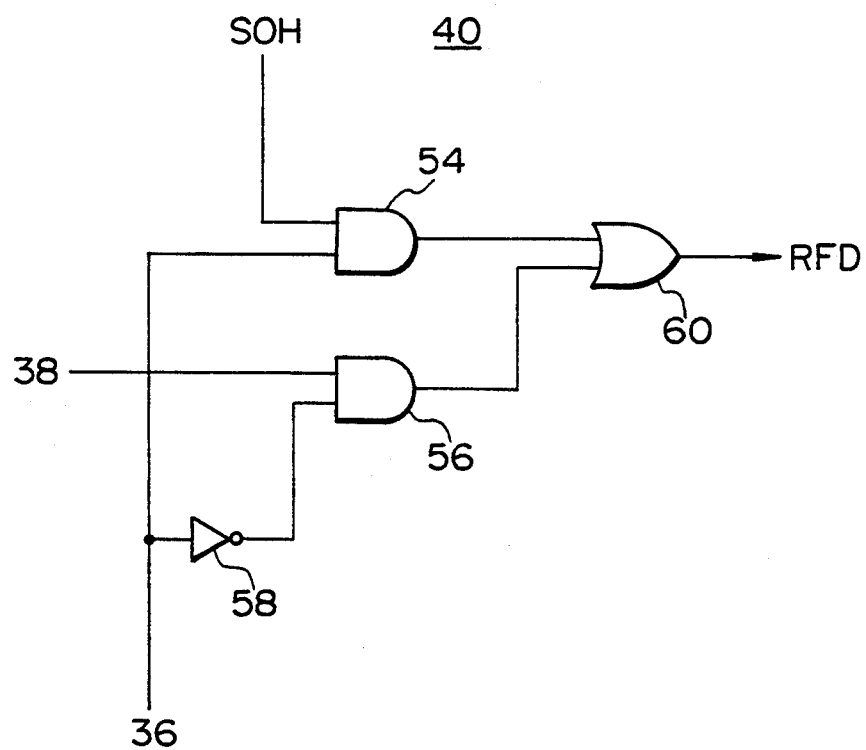
FIG. 7 is a circuit diagram showing a more detailed construction of the SOH insertion circuit 40 of FIG. 3.

FIG. 7 is a circuit diagram of the SOH insertion circuit 40 of FIG. 3. The SOH is stamped out by the synchronization pulses output from the IFD frame synchronization circuit 36 in an AND gate 54. The RFD, except for the SOH, are stamped out in an AND gate 56 by inverted synchronization pulses output by an inverter 58. Output signals of the AND gates 54 and 56 are input to an OR gate 60. The renewed RFD are produced in an output of the AND gate 60.

Although the aforementioned embodiment is described with regard to the case where signals conforming to the frame form prescribed in NNI of ISDN are radio-transmitted, the present invention is obviously applicable to a radio or line transmission system for transmitting general digital multiplex signals.

I claim:

1. A repeater station for relaying a series of first information signals constructed by inserting first auxiliary signals in accordance with a first frame form into a series of second information signals including second auxiliary signals conforming to a second frame form, comprising:
    first frame synchronization means to which the first information signals and clock signals ticking time of the first information signals are input, for performing frame synchronization of the first information signals with regard to the first frame form by operating in accordance with the clock signals, to thereby output first timing signals indicating the timing of the first auxiliary signals;
    gate means to which the clock signals and the first timing signals are input, for inhibiting the clock signals during the timing of the first auxiliary signals and for allowing the clock signals to pass through during other timings; and
    second frame synchronization means, to which the first information signals and the clock signals which pass through the gate means are input, for performing frame synchronization of the first information signals with regard to the second frame form by operating in accordance with the clock signals passing through the gate means, to thereby output second timing signals indicating the timing of the second auxiliary signals included in the first information signals.

2. A repeater station as claimed in claim 1, further comprising:
    information separating means to which the first information signals and the second timing signals are input, for reading-out the second auxiliary signals from the first information signals, and
    information insertion means, to which the first information signals and the second timing signals are input, for writing the second auxiliary signals on the first information signals.

3. A repeater station as claimed in claim 1, wherein the first frame synchronization means further comprises:
    a clock inhibition unit selectively operable for inhibiting the clock signals or allowing the clock signals to pass through;
    a frame synchronization pattern generation unit for cyclically generating a frame synchronization pattern conforming to the first frame form, operating the accordance with the clock signals from the clock inhibition unit;
    a data comparison unit for comparing the first information signals with the frame synchronization pattern;
    a synchronism protection unit which controls the clock inhibition unit for letting the clock inhibition unit inhibit the clock signals when coincidence is not detected in the data comparison unit, for letting the clock inhibition unit allow the clock signals to pass through when coincidence is detected in the data comparison unit, and for letting the clock inhibition unit continue to allow the clock signals to pass through after coincidence is successively detected during a predetermined period in the data comparison unit until disagreement is successively detected during a predetermined period in the data comparison unit; and
    a synchronization pulse generation unit operating in synchronism with the synchronization pattern generation unit for outputting the first synchronization signals.

4. A repeater station as claimed in claim 1, wherein the second frame synchronization means comprises:
    a clock inhibition unit selectively operable for inhibiting the clock signals or allowing the clock signals to pass through;
    a frame synchronization pattern generation unit for cyclically generating a frame synchronization pattern conforming to the second frame form, operating in accordance with the clock signals from the clock inhibition unit;
    a data comparison unit for comparing the first information signals with the frame synchronization pattern;
    a synchronism protection unit which controls the clock inhibition unit for letting the clock inhibition unit inhibit the clock signals when coincidence is not detected in the data comparison unit, for letting the clock inhibition unit allow the clock signals to pass through when coincidence is detected in the data comparison unit, and for letting the clock inhibition unit continue to allow the clock signals to pass through after coincidence is successively detected during a predetermined period in the data comparison unit until disagreement is successively detected during a predetermined period in the data comparison unit; and
    a synchronization pulse generation unit operating in synchronism with the synchronization pattern generation unit, for outputting the second synchronization signals.

5. A repeater station as claimed in claim 1, wherein the second frame form is a frame form conforming to Synchronous Digital Hierarchy in Integrated Services Digital Network.

* * * * *

UNITED STATES PATENT AND TRADEMARK OFFICE
CERTIFICATE OF CORRECTION

PATENT NO. : 5,357,542
DATED : October 18, 1994
INVENTOR(S) : SUZUKI

It is certified that error appears in the above-indentified patent and that said Letters Patent is hereby corrected as shown below:

Title Page, [56] References Cited, under OTHER PUBLICATIONS, line 3, after "(NTT)" insert --)--;

line 6, change "*Internatinoal*" to --*International*--.

Col. 1,   line 46, delete "enough".

Col. 3,   line 43, change "Row" to --Rows--;
          line 58, change "or" to --of--.

Col. 4,   line 41, after "passing" insert --therethrough--.

Signed and Sealed this

Fourteenth Day of March, 1995

Attest:

BRUCE LEHMAN

*Attesting Officer*      Commissioner of Patents and Trademarks